(12) United States Patent
Blackburn et al.

(10) Patent No.: US 7,889,671 B2
(45) Date of Patent: *Feb. 15, 2011

(54) METHODS AND APPARATUS TO DETERMINE DIGITAL SUBSCRIBER LINE CONFIGURATION PARAMETERS

(75) Inventors: Stuart Lynch Blackburn, San Ramon, CA (US); John Porter Van Slyke, Lafayette, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/482,893

(22) Filed: Jun. 11, 2009

(65) Prior Publication Data

US 2009/0245336 A1 Oct. 1, 2009

Related U.S. Application Data

(63) Continuation of application No. 11/153,473, filed on Jun. 15, 2005, now Pat. No. 7,558,213.

(51) Int. Cl.
*H04L 12/26* (2006.01)
(52) U.S. Cl. ....................................... 370/252
(58) Field of Classification Search ........................ None
See application file for complete search history.

(56) References Cited

U.S. PATENT DOCUMENTS

| | | | |
|---|---|---|---|
| 5,751,338 A | 5/1998 | Ludwig, Jr. |
| 5,974,139 A | 10/1999 | McNamara et al. |
| 5,987,061 A | 11/1999 | Chen |
| 6,044,107 A | 3/2000 | Gatherer et al. |
| 6,055,268 A | 4/2000 | Timm et al. |
| 6,081,291 A | 6/2000 | Ludwig, Jr. |

(Continued)

FOREIGN PATENT DOCUMENTS

WO     0205529     1/2002

(Continued)

OTHER PUBLICATIONS

Patent Cooperation Treaty, "International Search Report," issued by the International Searching Authority in connection with PCT application No. PCT/US2004/042840, mailed Mar. 7, 2007 (1 page).

(Continued)

*Primary Examiner*—Chirag G Shah
*Assistant Examiner*—Otis L Thompson, Jr.
(74) *Attorney, Agent, or Firm*—Hanley, Flight & Zimmerman, LLC

(57) ABSTRACT

Example methods and apparatus to determine digital subscriber line (DSL) configuration parameters based on current and historical DSL performance characteristics are disclosed. A disclosed method includes obtaining first data representative of a current performance characteristic for a DSL modem, obtaining second data representative of a historical performance characteristic for the DSL modem, computing, at a maintenance server, a configuration parameter using the first and the second data, and reinitializing the DSL modem with the computed DSL configuration parameter when the computed configuration parameter has a value different from a previous value of the configuration parameter, wherein the DSL configuration parameter is computed prior to the reinitializing of the DSL modem.

5 Claims, 3 Drawing Sheets

U.S. PATENT DOCUMENTS

| | | | |
|---|---|---|---|
| 6,246,694 B1 | 6/2001 | Chen | |
| 6,292,559 B1 | 9/2001 | Gaikwad et al. | |
| 6,317,495 B1 | 11/2001 | Gaikwad et al. | |
| 6,424,636 B1 | 7/2002 | Seazholtz et al. | |
| 6,424,657 B1 | 7/2002 | Voit et al. | |
| 6,430,219 B1 | 8/2002 | Zuranski et al. | |
| 6,445,733 B1 | 9/2002 | Zuranski et al. | |
| 6,466,088 B1 | 10/2002 | Rezvani et al. | |
| 6,467,092 B1 | 10/2002 | Geile et al. | |
| 6,477,238 B1 | 11/2002 | Schneider et al. | |
| 6,480,475 B1 | 11/2002 | Modlin et al. | |
| 6,498,791 B2 | 12/2002 | Pickett et al. | |
| 6,507,606 B2 | 1/2003 | Shenoi et al. | |
| 6,532,277 B2 | 3/2003 | Ulanskas et al. | |
| 6,538,451 B1 | 3/2003 | Galli et al. | |
| 6,549,568 B1 | 4/2003 | Bingel | |
| 6,567,464 B2 * | 5/2003 | Hamdi | 375/222 |
| 6,570,855 B1 | 5/2003 | Kung et al. | |
| 6,597,689 B1 | 7/2003 | Chiu et al. | |
| 6,608,835 B2 | 8/2003 | Geile et al. | |
| 6,614,781 B1 | 9/2003 | Elliott et al. | |
| 6,625,255 B1 | 9/2003 | Green et al. | |
| 6,636,525 B1 | 10/2003 | Davis | |
| 6,640,239 B1 | 10/2003 | Gidwani | |
| 6,643,266 B1 | 11/2003 | Pugaczewski | |
| 6,658,052 B2 | 12/2003 | Krinsky et al. | |
| 6,667,971 B1 | 12/2003 | Modarressi et al. | |
| 6,668,041 B2 | 12/2003 | Kamali et al. | |
| 6,674,725 B2 | 1/2004 | Nabkel et al. | |
| 6,674,749 B1 | 1/2004 | Mattathil | |
| 6,680,940 B1 | 1/2004 | Lewin et al. | |
| 6,697,768 B2 | 2/2004 | Jones et al. | |
| 6,700,927 B1 | 3/2004 | Esliger et al. | |
| 6,704,351 B1 | 3/2004 | Ott et al. | |
| 6,724,859 B1 | 4/2004 | Galli | |
| 6,728,238 B1 | 4/2004 | Long et al. | |
| 6,731,678 B1 | 5/2004 | White et al. | |
| 6,735,601 B1 | 5/2004 | Subrahmanyam | |
| 6,751,218 B1 | 6/2004 | Hagirahim et al. | |
| 6,751,315 B1 | 6/2004 | Liu et al. | |
| 6,751,662 B1 | 6/2004 | Natarajan et al. | |
| 6,754,283 B1 | 6/2004 | Li | |
| 6,762,992 B1 | 7/2004 | Lemieux | |
| 6,763,025 B2 | 7/2004 | Leatherbury et al. | |
| 6,765,864 B1 | 7/2004 | Natarajan et al. | |
| 6,765,918 B1 | 7/2004 | Dixon et al. | |
| 6,769,000 B1 | 7/2004 | Akhtar et al. | |
| 6,769,024 B1 | 7/2004 | Natarajan et al. | |
| 6,771,673 B1 | 8/2004 | Baum et al. | |
| 6,775,232 B1 | 8/2004 | Sue et al. | |
| 6,775,267 B1 | 8/2004 | Kung et al. | |
| 6,775,268 B1 | 8/2004 | Wang et al. | |
| 6,775,273 B1 | 8/2004 | Kung et al. | |
| 6,778,525 B1 | 8/2004 | Baum et al. | |
| 6,782,082 B2 | 8/2004 | Rahamim | |
| 6,785,288 B1 | 8/2004 | Enns et al. | |
| 6,801,570 B2 | 10/2004 | Yong | |
| 6,819,746 B1 | 11/2004 | Schneider et al. | |
| 6,914,961 B2 | 7/2005 | Holeva | |
| 6,985,444 B1 | 1/2006 | Rosen | |
| 7,035,249 B2 | 4/2006 | Christensen et al. | |
| 7,106,833 B2 | 9/2006 | Kerpez | |
| 7,158,563 B2 | 1/2007 | Ginis et al. | |
| 7,162,011 B2 | 1/2007 | Kolligs et al. | |
| 7,272,209 B2 | 9/2007 | Jiang et al. | |
| 7,440,552 B2 | 10/2008 | Lunt et al. | |
| 7,558,315 B2 * | 7/2009 | Cioffi et al. | 375/222 |
| 2002/0057763 A1 | 5/2002 | Sisk et al. | |
| 2002/0141443 A1 * | 10/2002 | Christensen et al. | 370/468 |
| 2004/0095921 A1 * | 5/2004 | Kerpez | 370/351 |
| 2006/0268733 A1 | 11/2006 | Rhee et al. | |
| 2007/0274458 A1 | 11/2007 | Jiang et al. | |

FOREIGN PATENT DOCUMENTS

| | | |
|---|---|---|
| WO | 2005072102 | 8/2005 |

OTHER PUBLICATIONS

Patent Cooperation Treaty, "Written Opinion of the International Searching Authority," issued by the International Searching Authority in connection with PCT application No. PCT/US2004/042840, mailed Mar. 7, 2007 (4 pages).

Patent Cooperation Treaty, "International Preliminary Report on Patentability," issued by the International Bureau of WIPO in connection with PCT application No. PCT/US2004/042840, mailed Apr. 11, 2007 (5 pages).

United States Patent and Trademark Office, "Non-Final Office Action," issued in connection with U.S. Appl. No. 10/761,123, mailed Feb. 9, 2007 (11 pages).

United States Patent and Trademark Office, "Notice of Allowance and Fee(s) Due," issued in connection with U.S. Appl. No. 10/761,123, mailed Jul. 12, 2007 (6 pages).

International Telecommunication Union, "Series G: Transmission Systems and Media, Digital Systems and Networks. Digital Sections and Digital Line System-Access Networks. Asymmetric Digital Subscriber Line (ADSL2)," G.992.3, ITU-T, Jul. 2002, pp. 1-312. (312 pages).

United States Patent and Trademark Office, "Office Action," issued in connection with U.S. Appl. No. 11/153,473, mailed Mar. 14, 2008 (13 pages).

United States Patent and Trademark Office, "Office Action," issued in connection with U.S. Appl. No. 11/153,473, mailed Nov. 28, 2008 (15 pages).

United States Patent and Trademark Office, "Notice of Allowability," issued in connection with U.S. Appl. No. 11/153,473, mailed Feb. 5, 2009 (7 pages).

United States Patent and Trademark Office, "Notice of Allowability," issued in connection with U.S. Appl. No. 11/153,473, mailed May 7, 2009 (11 pages).

* cited by examiner

METHODS AND APPARATUS TO DETERMINE DIGITAL SUBSCRIBER LINE CONFIGURATION PARAMETERS

RELATED APPLICATIONS

This patent claims priority to U.S. patent application Ser. No. 11/153,473, entitled "Methods and Apparatus to Determine Digital Subscriber Line Configuration Parameters, and filed Jun. 15, 2005, which is hereby incorporated by reference in its entirety.

FIELD OF THE DISCLOSURE

This disclosure relates generally to digital subscriber line (DSL) communications, and, more particularly, to methods and apparatus to determine DSL configuration parameters based on current and historical DSL performance characteristics.

BACKGROUND

When a customer requests DSL service (e.g., Asymmetric DSL (ADSL), Symmetric DSL (SDSL), High-speed DSL (HDSL), etc.) it can be difficult for the service provider to determine the highest DSL data rate that the telephone line between the central office and the customer's location can reliably achieve (e.g., with sufficiently low receiver error rates) (i.e., the maximum capable DSL speed). Often, the service provider determines, and offers, a DSL data rate (i.e., a DSL configuration parameter) that is determined based on an estimate of the length of the telephone line. For instance, consider an example customer site that is 12,000 feet from a central office (CO). The service provider knows that most telephone lines of that length can reliably attain 1.5 Million bits per second (Mbps) and, thus, offers that DSL data rate to the customer. However, some customers at that distance can reliably achieve 3 Mbps. Thus, the customer is not offered the highest possible DSL data rate (possibly causing the customer to select a broadband service from an alternative service provider), and/or the service provider loses potential revenue from not being able to sell a higher DSL data rate.

A similar difficulty arises in situations where: a) a customer already has DSL service and now has interest in a higher data rate; or b) a service provider wishes to determine which customers could be offered a higher data rate, in an effort to increase revenues from DSL services. In general, there is a difference between the estimated DSL data rate and the maximum DSL data rate that a telephone line is capable of reliably supporting (i.e., the maximum capable DSL speed).

In typical central offices, a plurality of CO DSL modems (i.e., DSL modems co-located at the CO) are integrated together to form a well-known prior-art DSL Access Multiplexer (DSLAM). Thus, a DSLAM supports simultaneous DSL communications with a plurality of customer premise equipment (CPE) DSL modems (i.e., DSL modems located at a plurality of customer locations) across a plurality of telephone lines.

A pair of CPE and CO DSL modems can measure and report statistics concerning the performance of DSL communications currently active between them (i.e., DSL performance characteristics). For example, the pair of modems can measure the maximum attainable bit rate (MABR) that the pair of modems could currently achieve on the telephone line, a count of receiver errors over fixed intervals of time (e.g., 15 minutes, 24 hours, etc.), etc. Typically, the MABR will be larger than the maximum capable DSL speed that represents the DSL data rate that the telephone line is capable of reliably supporting. A large count of receiver errors in a fixed interval of time can indicate the presence of impulse noise on the telephone line.

DSL performance characteristics (e.g., the current MABR, the count of receiver errors, etc.) can be measured and reported using a variety of well know techniques. For example, they can be measured based on the International Telecommunications Union (ITU) G.992.1 standard for ADSL and/or the ITU G.997.1 standard for management of DSL modems. In particular, DSL modems can monitor forward error correction (FEC) errors to detect and count receiver errors, and can accumulate the number of FEC errors that occurred in a sliding interval of time (e.g., 15 minutes, 24 hours, etc.). However, as discussed above, the current MABR reported by the CO or CPE DSL modem may be different (e.g., higher or lower) from the current DSL data rate being sold to the customer.

DETAILED DESCRIPTION

As discussed above, the length of a telephone line is not always a good indication of the maximum capable DSL speed for that telephone line. Relying on current DSL performance characteristics (e.g., MABR, count of receiver errors, etc.) as an indication of appropriate DSL configuration parameters (e.g., DSL data rate) ignores conditions on the telephone line (e.g., varying noise, temperature, moisture, etc.) that may cause variations in DSL performance (e.g., varying MABR, or bursts of receiver errors due to impulse noise). For example, current DSL performance characteristics (e.g., MABR) could indicate that the telephone line can support 2 Mbps, while past (i.e., historical) DSL performance characteristics could indicate that the telephone line can reliably only support 1.5 Mbps. Thus, using both current and historical DSL performance characteristics provides a more accurate and consistent measure of the maximum capable DSL speed for a telephone line.

Figure 1:
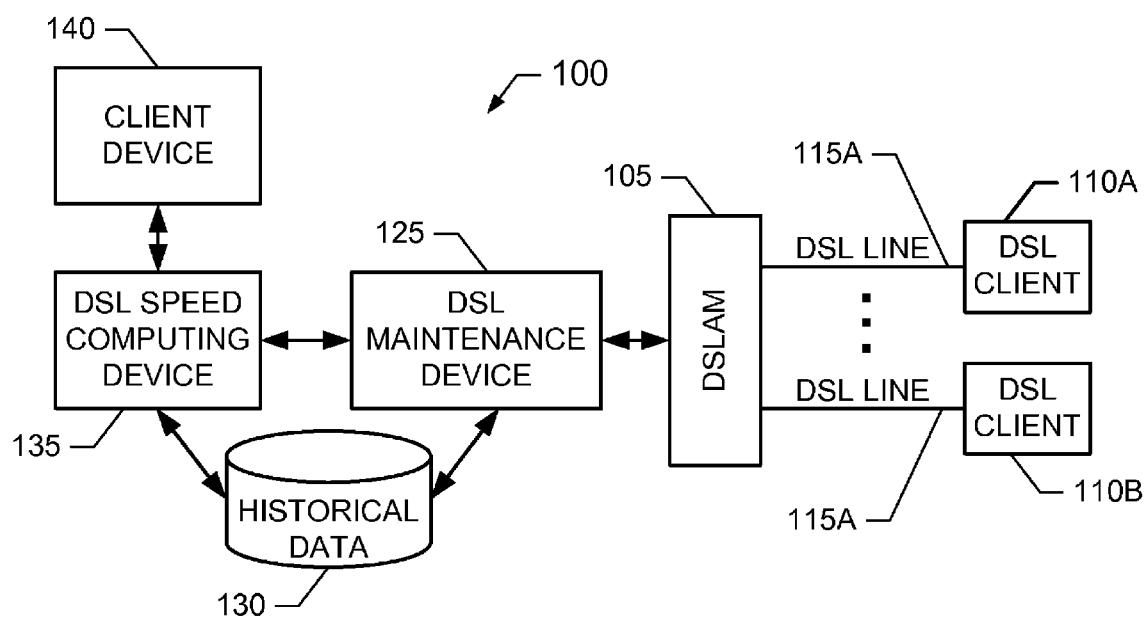
FIG. 1 is a schematic illustration of an example DSL system constructed in accordance with the teachings of the invention.

FIG. 1 illustrates an example DSL system 100 constructed in accordance with the teachings of the invention that uses both current and historical DSL performance characteristics to determine one or more DSL configuration parameters (e.g., a maximum capable DSL speed, a need for interleaving, etc.). To monitor, measure or record current and historical DSL performance characteristics for DSL communications occurring between a DSLAM 105 and a plurality of DSL modems 110A-B connected via a plurality of telephone lines 115A-B, the example DSL system 100 includes a DSL Maintenance Device (DMD) 125 and a database 130. In the illustrated example of FIG. 1, the DSLAM 105 and the DSL modems 110A-B measure, among other things, the current MABR and the number of FEC errors for the most recent 15 minutes (i.e., the current 15-minute error count) for the plurality of telephone lines 115A-B. It will be readily apparent to persons of ordinary skill in the art that other DSL performance characteristics could be monitored, measured or recorded by the DSLAM 105 and the plurality of DSL modems 110A-B. For example, interleaved data stream anomalies, current noise margin, etc.

In the illustrated example of FIG. 1, the DMD 125 collects, over time, the DSL performance characteristics measured by the DSLAM 105 and the plurality of modems 110A-B, and stores the collected characteristics into the database 130. For example, the DMD 125 periodically, or occasionally, interacts with the DSLAM 105 to retrieve the current MABR and the current 15-minute error count for each active DSL line (i.e., each telephone line providing active DSL communications between the DSLAM 105 and one of the plurality of DSL modems 110A-B). For instance, the DMD 125 may be connected to the DSLAM 105 via an Ethernet network using Internet Protocol (IP) communication protocols that allows the DMD 125 to access registers in the DSLAM 105 that contain the current MABR and the current 15-minute error count for each active DSL line.

It will be readily apparent to persons of ordinary skill in the art that the DMD 125 could collect and record additional DSL performance characteristics into the database 130. For example, interleaved data stream anomalies, current noise margin, etc. It will also be readily apparent to persons of ordinary skill in the art that the DMD 125 and the database 130 could be implemented using any suitable computing platform. For example, a personal computer or computer server could be used to implement the DMD 125, and a non-volatile memory device (e.g., a hard-disk drive) associated with the personal computer or computer server could be used to implement the database 130.

In the illustrated example of FIG. 1, the DMD 125 records each MABR and 15-minute error count collected from the DSLAM 105 into the database 130, thereby creating, over time, a database of parameters representative of the historical maximum speeds for each DSL line, and the historical presence of impulse noises. The collected data may be stored and organized in the database 130 using any one of a variety of well-known techniques. For example, the data may be stored in an array of data structures.

It will be readily appreciated by persons of ordinary skill in the art that the DMD 125 can interact with the DSLAM 105 on a periodic or occasional basis. For example, once a week the DMD 125 could record a current MABR and 15-minute error count for each active DSL line into the database 130. The DMD 125 could also identify underperforming DSL lines (e.g., DSL lines whose current DSL data rate is below a previously determined maximum capable DSL speed). For such DSL lines, MABR and 15-minute error count values could be collected more frequently (e.g., once an hour). Telephone lines on which to collect data more frequently could also be determined by a marketing or sales organization. For example, the marketing and sales organization might select, based on demographics, past service orders, etc., customers (i.e., DSL lines) who might be interested in a higher DSL data rate. Gathering data more frequently facilitates an even more accurate determination of DSL configuration parameters (e.g., the maximum capable DSL speed) for a telephone line.

To determine DSL configuration parameters for a telephone line (e.g., a maximum capable speed, a need for interleaving, etc.) based on the current and historical DSL performance characteristics, the illustrated example of FIG. 1 includes a DSL Speed Computing Device (DSCD) 135 and a client device 140. In the illustrated example of FIG. 1, the client device 140 can be either a device supporting transactional interactions with the DSCD 135 (e.g., a terminal used by a customer service representative), or a device supporting "batch" interactions with the DSCD 135 (e.g., a computer used for marketing research). In a customer service example (i.e., transactional), the client device 140 requests from the DSCD 135 the maximum capable DSL speed for a specified telephone line. The specific telephone line is the telephone line for which a customer is calling to request a higher data rate DSL service, or is reporting a DSL service problem (e.g., inability to connect, high receiver error rate, etc.). In this example, the customer and customer service representative handling the call are interested in a reasonably prompt response from DSCD 135. In the illustrated example of FIG. 1, the DSCD 135 uses applicable (e.g., determined as described below) historical DSL performance characteristics for the specified telephone line (present in the database 130) together with current data DSL performance characteristics for the specified telephone line (obtained from the DMD 125) to determine the current maximum capable DSL speed (i.e., a DSL configuration parameter) for the specified telephone line. In another example, the customer already has a DSL modem connected to the telephone line, and is calling to request new DSL service. In this example, the DSCD 135 can only rely on the current DSL performance characteristics for the specified telephone line (obtained from the DMD 125) to determine the current maximum capable DSL speed.

In a marketing example (i.e., "batch"), the client device 140 identifies a plurality of telephone lines for which a user desires DSL configuration parameters (e.g., maximum capable DSL speeds). For efficiency, processing may be performed in a "batch" mode. That is, the client device 140 provides to the DSCD 135 a list containing the identified telephone lines. The DSCD 135 then determines (e.g., using an iterative process) one or more DSL configuration parameters (e.g., a maximum capable DSL speed) for each of the identified telephone lines, and reports a list of the determined DSL configuration parameters to the client device 140.

It will be readily apparent to persons of ordinary skill in the art that the client device 140 may be implemented using any one of a variety of well known devices. In an example, the client device 140 could be a computer display or terminal (or equivalent user interface device or software), connected to the DSCD 135 via any one of a variety of well known techniques (e.g., serial cable, Ethernet, video cable), capable to allow a user (e.g., a customer service representative) to specify a telephone line for which the user desires the maximum capable DSL speed (i.e., a DSL configuration parameter). In another example, the client device 140 could be a personal computer, computer server, or other suitable computing platform, connected to the DSCD 135 via any one of a variety of well known techniques (e.g., serial cable, Ethernet, Internet, etc.), capable of communicating with the DSCD 135. In particular, the client device 140 may execute software to: a) allow a user (e.g., a marketing or salesperson) to select a list of one or more telephone lines; b) send the list of telephone lines to the DSCD 135; c) receive from the DSCD 135 DSL configuration parameters (e.g., a maximum capable DSL speed) for each of the selected telephone lines; and d) provide a display or report of the reported DSL configuration parameters to the user.

To determine a maximum capable DSL speed for a telephone line (i.e., a DSL configuration parameter), the DSCD 135 of FIG. 1 a) acquires current DSL performance characteristics for the telephone line from the DMD 125; b) collects historical performance characteristics for the telephone line from the database 130; and c) determines the maximum capable DSL speed based on the current and historical DSL performance characteristics. It will be readily apparent to persons of ordinary skill in the art that the DSCD 135 can use any one of a variety of methods to determine a maximum capable DSL speed from current and historical DSL line performance characteristics. For example, the DSCD 135 of FIG. 1 could use the current and historical values of MABR (i.e., a DSL performance characteristic) for the telephone line to determine the maximum capable DSL speed. For instance, the DSCD 135 could determine a minimum of the current and applicable historical MABR values, and then scale, using a scale factor, the determined minimum value to determine the maximum capable DSL speed. In this example, the maximum capable DSL speed can be expressed mathematically as Max_capable=scale_factor*min{current, historical}, where Max_capable is the maximum capable DSL speed, {current, historical} represents the set of current and historical MABR values for the telephone line, and scale_factor is any appropriate numerical value.

It will be readily apparent to persons of ordinary skill in the art that the scale factor can be chosen using any of a variety of techniques. In the illustrated example of FIG. 1, the scale factor is chosen to have a value less than one (1), where the value chosen depends upon the number of applicable historical values, and the number of applicable historical values depends upon the DSL usage and configuration history of the telephone line. In an example, the customer has subscribed to DSL service for an extended period of time and always leaves the DSL service active (i.e., the DSL modem turned on and connected to the CO). Thus, all of the historical data can be considered valid (i.e., applicable), and the scale factor is chosen to be 80% (i.e., 0.8). In a second example, the customer is reporting trouble with their DSL service (e.g., bursts of errors, etc.) such that any historical data present in the database 130 is considered invalid (i.e., non-applicable), and the scale factor is chosen to be 60% (i.e., 0.6). In another example, the DSL line has had a configuration change (e.g., DSL data rate change, enabling interleaving, etc.), any historical data present in the database 130 prior to the configuration change is considered invalid (i.e., non-applicable), and any historical data present in the database 130 after the configuration change is considered valid (i.e., applicable). In general, a greater number of available and applicable historical values results in selection of a larger scale factor value. In an example, the scale factor is chosen to be 80% (i.e., 0.8) if at least 4 applicable historical data points are available, 75% if 3 applicable historical data points are available, 70% if 2 applicable historical data points are available, and 60% (i.e., 0.6) otherwise. When determining a DSL configuration parameter, only those available and applicable historical values are used and other, non-applicable, values are discarded. It will be readily apparent to persons of ordinary skill in the art, that scale factor values and corresponding numbers of applicable historical values can be different from those discussed above.

The DSCD 135 of FIG. 1 can also use additional current and applicable historical DSL performance characteristics to determine other DSL configuration parameters for the telephone line, and report the additional determined configuration parameter(s) to the client device 140. For example, the DSCD 135 could use current and applicable (e.g., determined as discussed above) historical 15-minute error counts (i.e., a DSL performance characteristic) to determine if interleaving (i.e., a DSL configuration parameter) should be enabled for the telephone line. In particular, the DSCD 135 determines the maximum of the current and applicable historical 15-minute error counts, and determines that interleaving should be enabled if the determined maximum is greater than a threshold. In the example of FIG. 1, the threshold is selected to represent a 15-minute error count (e.g., 500) that is indicative that the telephone line probably has impulse noise problems.

By having the DSCD 135 provide, for example, to the client device 140, determined DSL configuration parameters, the client device 140 can ensure that a service plan (e.g., a DSL data rate) sold to and configured for a customer will operate reliably (e.g., not experience a large numbers of receiver errors that might interfere with the customer's use of the DSL service). In an example, a customer contacts customer service to inquire about a higher data rate DSL service, the customer service representative (via the client device 140) obtains from the DSCD 135 DSL configuration parameters (e.g., the maximum capable DSL speed that the customer's DSL line can reliably support and whether interleaving is required). Based upon the information obtained from the DSCD 135 via the client device 140, the customer service representative can inform the customer of the highest DSL data rate the service provider can reliably provide. If, based upon that information (i.e., the maximum capable DSL speed), the customer requests a higher data rate (not exceeding the maximum capable DSL speed), the customer service representative can create an appropriate work order (e.g., a request to re-configure the customer's DSL service) that includes the selected DSL data rate, and the enabling of interleaving (as determined and reported by the DSCD 135) as appropriate.

Figure 2:
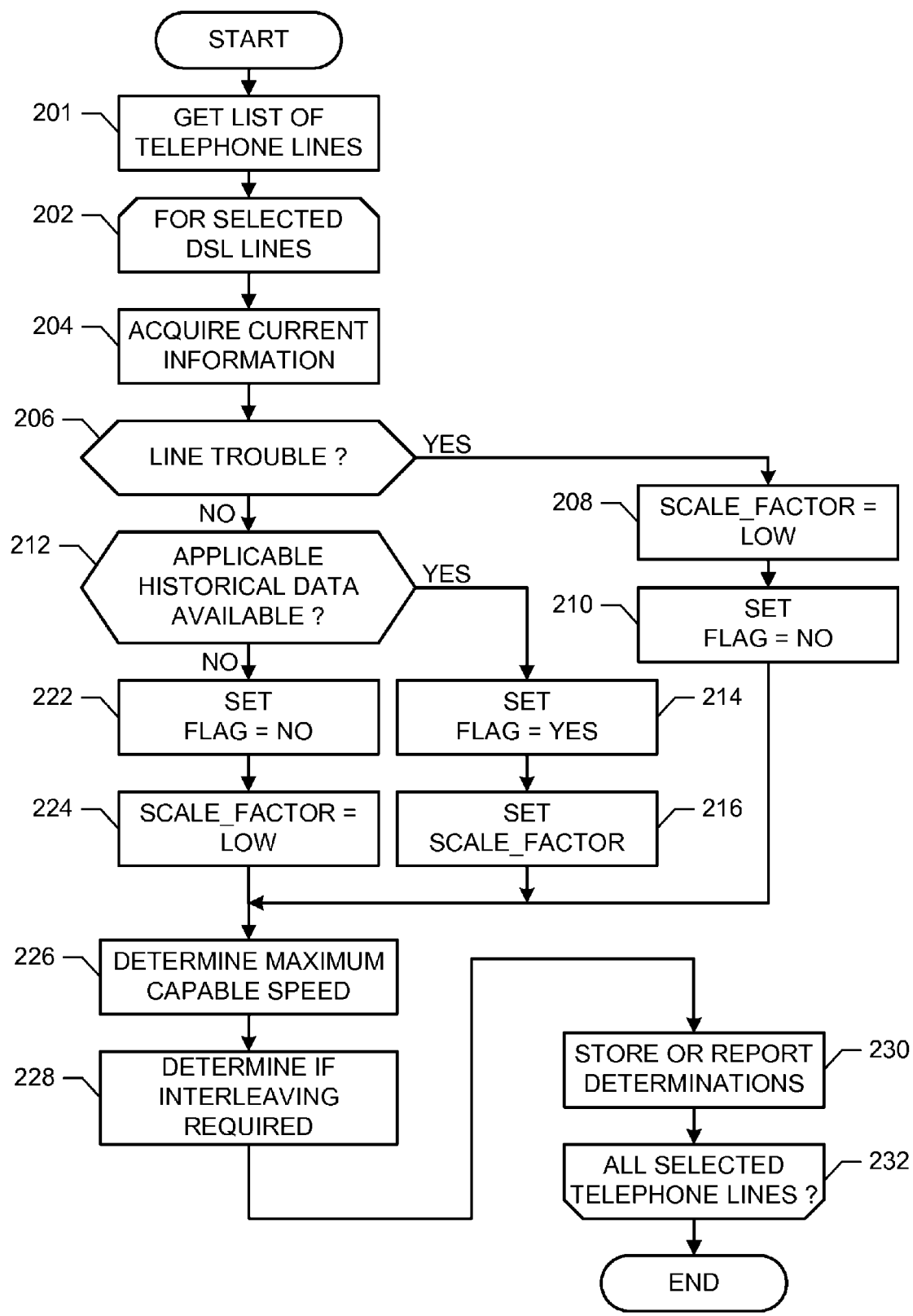
FIG. 2 is a flowchart representative of example machine readable instructions which may be executed to implement the DSL speed computing device of FIG. 1.

FIG. 2 illustrates a flowchart representative of example machine readable instructions that may be executed by a processor (e.g., the processor 310 of FIG. 3) to implement the example DSCD 135 of FIG. 1. The machine readable instructions of FIG. 2, the example DMD 125, and/or the example DSCD 135 may be executed by a processor, a controller and/or any other suitable processing device. For example, the machine readable instructions of FIG. 2, the DMD 125, and/or the example DSCD 135 may be embodied in coded instructions stored on a tangible medium such as a flash memory, or random access memory (RAM) associated with the processor 310 shown in the example processor platform 300 and discussed below in conjunction with FIG. 3. Alternatively, some or all of the example machine readable instructions of FIG. 2, the DMD 125, and/or the example DSCD 135 may be implemented using an application specific integrated circuit (ASIC), a programmable logic device (PLD), a field programmable logic device (FPLD), discrete logic, hardware, etc. Also, some or all of the machine readable instructions of FIG. 2, the DMD 125, and/or the example DSCD 135 may be implemented manually or as combinations of any of the foregoing techniques. Further, although the example machine readable instructions of FIG. 2 are described with reference to the flowchart of FIG. 2, persons of ordinary skill in the art will readily appreciate that many other methods of implementing the example DSCD 135 of FIG. 1 may be employed. For example, the order of execution of the blocks may be changed, and/or some of the blocks described may be changed, eliminated, or combined.

It will be readily apparent to persons of ordinary skill in the art that the DMD 125, the database 130, the DSCD 135, and/or the client device 140 may be integrated together using a single computing platform. For example, the example processor platform 300 of FIG. 3.

The example machine readable instructions of FIG. 2 begin when the DSCD 135 receives from, for example, the client device 140 a list containing one or more selected telephone lines (block 201), thus, supporting both transactional and "batch" interaction modes. In the example machine readable instructions of FIG. 2, for each selected telephone line (looping block 202), the DSCD 135 determines a maximum capable DSL speed, and whether or not interleaving should be enabled. The DSCD 135 obtains current DSL performance characteristics (e.g., MABR and 15-minute error count) from the DMD 125 (block 204). The DSCD 135 determines if the telephone line has DSL service trouble reported or detected (e.g., caused by a high number of receiver errors, etc.) (block 206). If the telephone line has DSL service trouble reported (block 206), the DSCD 135 sets the value of the scale factor to a low value (e.g., 60%) (block 208). The DSCD 135 then sets a flag equal to NO to indicate that available historical data is invalid (i.e., not applicable) and, thus, discarded and/or not to be used (block 210).

Returning to block 206, if the telephone line does not have DSL trouble reported, the DSCD 135 determines (as discussed above) if applicable historical data is available (block 212). If applicable historical data is available (block 212), the DSCD 135 sets the flag equal to YES to indicate that applicable historical data is available (block 214), and sets the value of the scale factor based on the number of applicable historical data points (block 216). For example, the scale factor is chosen to be 80% (i.e., 0.8) if at least 4 applicable historical data points are available, 75% if 3 applicable historical data points are available, 70% if 2 applicable historical data points are available, and 60% (i.e., 0.6) otherwise.

Returning to block 212, if no applicable historical data is available, the DSCD 135 sets the flag equal to NO to indicate that there is no applicable historical data available (block 222). The DSCD 135 then sets the value of the scale factor to a low value (e.g., 60%) (block 224).

Continuing at block 226, the DSCD 135 determines (as described above) a maximum capable DSL speed (block 226), and determines (as described above) whether or not interleaving should be enabled for the DSL service on the telephone line (block 228). In blocks 226 and 228, the DSCD 135 uses the value of the flag to determine if historical data is used in the determination of the minimum MABR or the maximum 15-minute error count. For example, if the flag is NO, historical data is not used.

The DSCD 135 then stores into the database 130, or reports to the client device 140, the determined DSL configuration parameters (e.g., the maximum capable DSL speed and whether or not interleaving should be enabled) (block 230). For example, if the client device 140 is interacting with the DSCD 135 in a transactional mode, the DSCD 135 could immediately report the determined DSL configuration parameters. Alternatively, the DSCD 135 could store the results for later reporting to the client device 140 (i.e., "batch" mode). If all selected telephone lines have been processed (block 232), the example machine readable instructions of FIG. 2 end. Otherwise, the DSCD 135 returns to block 202 to process the next selected telephone line.

It will be readily apparent to persons of ordinary skill in the art that the DSCD 135 could determine other DSL configuration parameters (e.g., minimum noise margin, Reed Solomon coding parameters, etc.) based on additional current and historical DSL performance characteristics (e.g., interleaved data stream anomalies, current noise margin, etc.)

Figure 3:
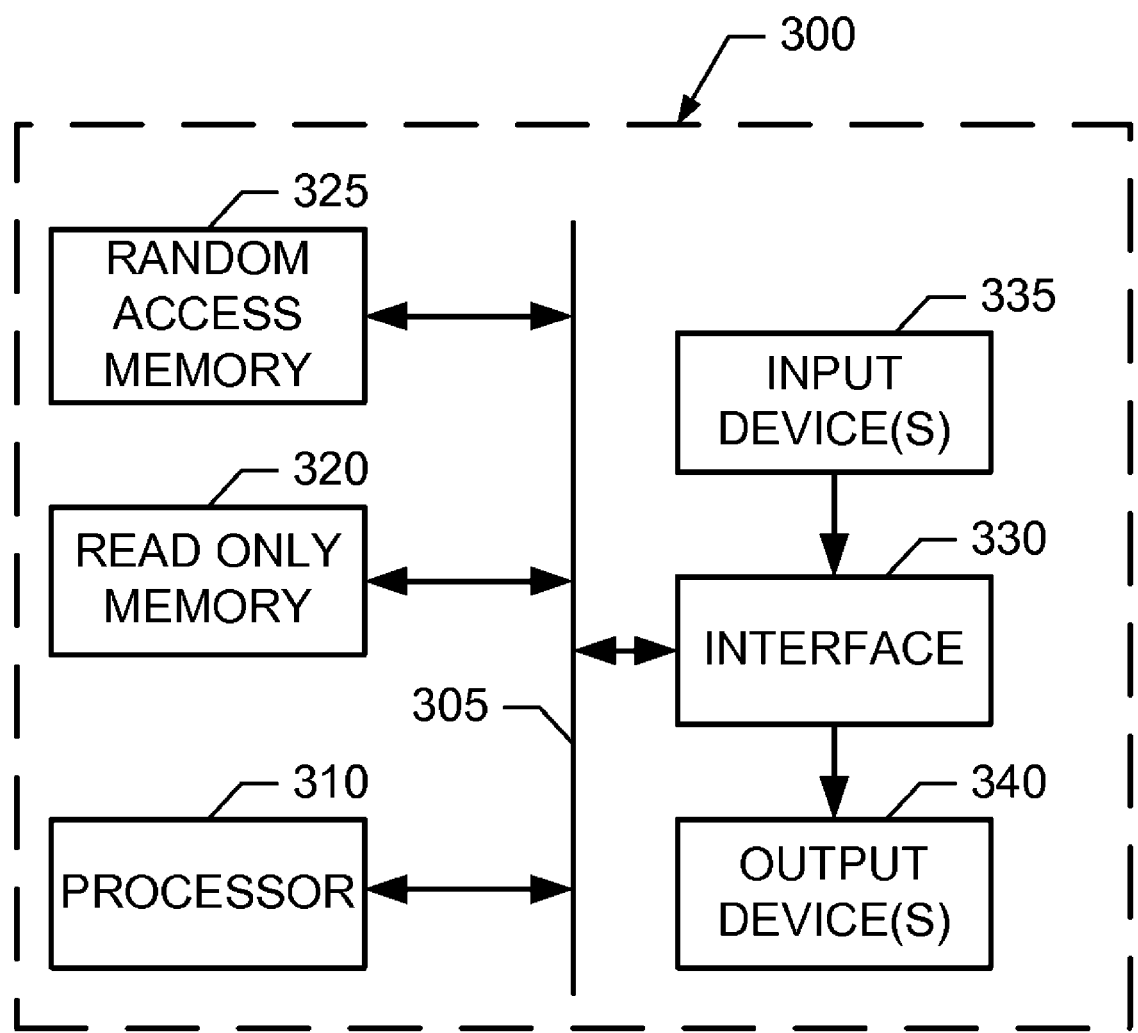
FIG. 3 is a schematic illustration of an example processor platform that may execute the example machine readable instructions represented by FIG. 2 to implement the DSL speed computing device of FIG. 1.

FIG. 3 is a schematic diagram of an example processor platform 300 capable of executing the example machine readable instructions of FIG. 2 to implement the DSCD 135 of FIG. 1. For example, the processor platform 300 can be implemented by one or more general purpose microprocessors, microcontrollers, etc.

The processor platform 300 of the example of FIG. 3 includes a general purpose programmable processor 310. The processor 310 executes coded instructions present in main memory of the processor 310. The processor 310 may be any type of processing unit, such as a microprocessor from the Intel® or AMD® families of microprocessors. The processor 310 may implement, among other things, the DMD 125, the DSCD 135 of FIG. 1 by, for example, executing the machine readable instructions of FIG. 2, and/or the client device 140.

The processor 310 is in communication with the main memory (including a read only memory (ROM) 320 and a RAM 325) via a bus 305. The RAM 325 may be implemented by Synchronous Dynamic Random Access Memory (SDRAM), Dynamic DRAM, and/or any other type of RAM device. The ROM 320 may be implemented by flash memory and/or any other desired type of memory device. Access to the memory 320 and 325 is typically controlled by a memory controller (not shown) in a conventional manner. The RAM 325 could be used to implement the database 130 of FIG. 1.

The processor platform 300 also includes a conventional interface circuit 330. The interface circuit 330 may be implemented by any type of well known interface standard, such as an external memory interface, serial port, general purpose input/output, etc.

One or more input devices 335 and one or more output devices 340 are connected to the interface circuit 330. The input devices 335 and output devices 340 may be used to implement interfaces between the DSCD 135 and the database 130, and/or between the DMD 125 and the database 130.

Of course, persons of ordinary skill in the art will recognize that the order, size, and proportions of the memory illustrated in the example systems may vary. Additionally, although this patent discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising,
    obtaining first data representative of a current performance characteristic for a digital subscriber line (DSL) modem;
    obtaining second data representative of a historical performance characteristic for the DSL modem;
    computing, by a maintenance server, a configuration parameter using the first and the second data; and
    reinitializing the DSL modem with the computed DSL configuration parameter when the computed configuration parameter has a value different from a previous value of the configuration parameter, wherein the current performance characteristic represents a maximum attainable DSL speed, wherein the configuration parameter represents a maximum capable DSL speed, the DSL configuration parameter is computed prior to the reinitializing of the DSL modem, wherein determining the maximum capable DSL speed based on the first and the second data comprises determining a minimum in the first and the second data, wherein determining the maximum capable DSL speed based on the first and the second data further comprises multiplying a scale factor and the minimum in the first and the second data, and wherein the scale factor is selected based upon a number of data points in the second data.

2. A method as defined in claim 1, wherein the second data includes data points, and further comprising discarding at least one of the data points if either a DSL service associated with the DSL modem is reported as malfunctioning, or a second configuration parameter for the DSL modem is modified.

3. A method as defined in claim 1, wherein the second data corresponds to a time period having a predetermined characteristic.

4. A method comprising,
obtaining first data representative of a current performance characteristic for a digital subscriber line (DSL) modem;
obtaining second data representative of a historical performance characteristic for the DSL modem;
computing, by a maintenance server, a configuration parameter using the first and the second data; and
reinitializing the DSL modem with the computed DSL configuration parameter when the computed configuration parameter has a value different from a previous value of the configuration parameter, wherein the current performance characteristic value represents a count of receiver errors over a time period, and wherein the configuration parameter represents whether or not interleaving is enabled for a telephone line, and computing the configuration parameter based on the first and the second data comprises:
determining a maximum in the first and the second data; and
enabling interleaving for the telephone line if the maximum in the first and the second data is greater than a threshold.

5. An article of manufacture comprising a tangible storage medium excluding propagating signals and storing machine readable instructions that, when executed, cause a processor to:
obtain first data representative of a current performance characteristic for a digital subscriber line (DSL) modem, wherein the current performance characteristic is a count of receiver errors over a time period;
obtain second data representative of a historical performance characteristic of the DSL modem;
compute a configuration parameter based on the first and second data by determining a maximum in the first and second data and enabling interleaving if the determined maximum is greater than a threshold, wherein the configuration parameter represents interleaving enablement; and
when the computed configuration parameter has a value different from a previous value of the configuration parameter, reinitialize the DSL modem with the computed configuration parameter, wherein the tangible storage medium excludes propagating signals.

* * * * *